Nov. 25, 1952  L. F. JEZEK  2,618,862
WHEEL ALIGNMENT DEVICE
Filed Oct. 24, 1947
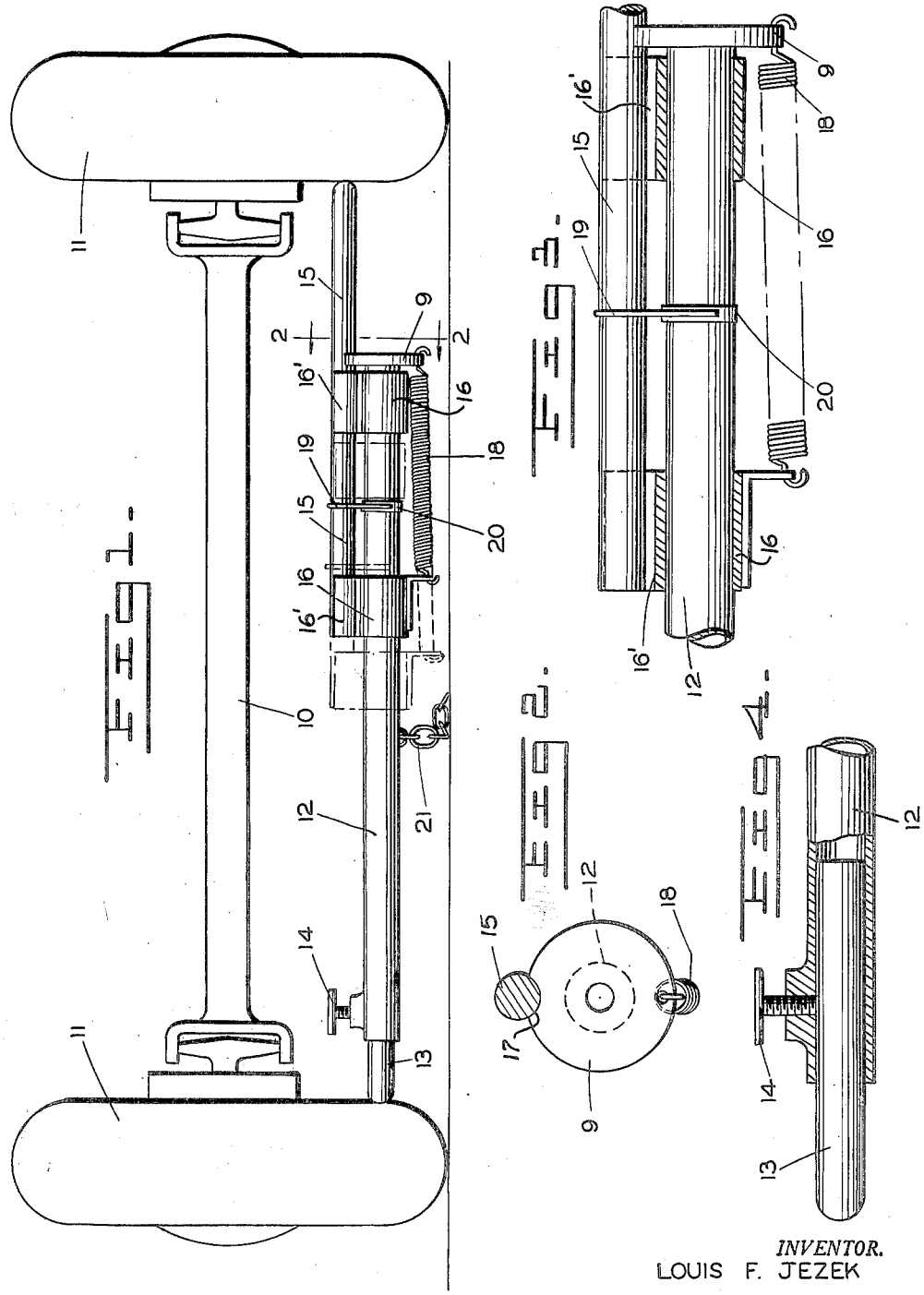
INVENTOR.
LOUIS F. JEZEK
BY Wilfred C. Lawson
ATTORNEY Patented Nov. 25, 1952

2,618,862

UNITED STATES PATENT OFFICE 2,618,862

WHEEL ALIGNMENT DEVICE

Louis Frank Jezek, Temple, Tex.

Application October 24, 1947, Serial No. 781,873

1 Claim. (Cl. 33—203.2)

My invention relates to a handy and useful implement for garages and automobile repair shops and is intended for checking and adjusting the true position of a pair of vehicle wheels.

It consists of a gage to be suspended between a pair of wheels to ascertain whether they are in or out of true running, and by which the reading of an error can be made almost instantaneously. It can be quickly applied and consists of a few parts easily obtainable and therefore manufactured at low cost. It can stand rough handling without getting out of order.

These objects and advantages are made clear by the subjoined description with the aid of the attached drawing.

Figure 1 is a front elevation of a portion of an automobile showing the front wheels with my gage suspended between them.

Figure 2 is a sectional view taken substantially on the line 2—2 of Figure 1.

Figure 3 is an enlarged fragmentary view partly in section and partly in elevation at the right end portion of the device as illustrated in Figure 1.

Figure 4 is a fragmentary view partly in elevation and partly in section of the left hand end portion of the device as illustrated in Figure 1.

In the drawing reference numeral 10 denotes the front wheel axle of an automobile or other vehicle with a wheel 11 mounted in conventional manner at each end thereof.

The alinement device or wheel gage is shown beneath the wheel axle and consists of a metal tube 12 with a finger or rod 13, having a rounded tip and telescopically mounted in the tube 12 and held in adjusted position by a set screw 14 with its tip end projecting at the left of Figure 1.

At the opposite end of the tube 12 is provided a fixed collar 9 and above the tube 12 is mounted a second finger or rod 15 also having a reduced or rounded tip and projecting beyond the collar 9 and carried in pairs of lugs 16' integral with spaced sleeves 16 which are slidable on said tube 12. The rod 15 is supported in a key notch 17 formed in the edge of the collar 9 at all times during its movements relative to the tube 12.

A tension spring 18 having its ends secured to the collar 9 and one of the sleeves 16, tends to urge the sliding finger 15 outwardly with its tip beyond the collar 9. Mounted centrally on those portions of the tube 12 and the finger 15 are cooperative indexes 20 and 19, respectively, which are adjustable, one with respect to the other, following the placing of the gage in its operative position.

About midway between the tip ends of fingers 13 and 15 a short chain 21 is secured, about eight inches in length. A suitable length of the tube 12 is about three feet, nine inches or more, and a tension spring 18 about twelve inches free length and one fourth inch in diameter, tends to pull the finger 15 out beyond the collar 9; but other dimensions may of course be employed for different conditions.

This wheel gage or alinement device is used in the following manner:

The automobile or any other two or four wheeled vehicle is placed on level ground for ascertaining whether two wheels, either front or rear, run true and the device held a short distance from ground not higher than the wheel axle, at the lower front side of the wheels or more exactly, so that the chain 21 just touches the ground when it hangs down freely.

With the set screw 14 loosened, the finger 13 is moved into contact with one wheel tire while the finger 15 is held in contact with the opposite tire, after which screw 14 is tightened, so that the gage is supported from the points of the fingers 13, 15 in contact with the two wheel tires 11; following which the indexes are adjusted to exactly register with each other. The next step is thereupon to push the vehicle forward two or three feet on the ground, that is until the chain 21 again lightly touches the ground on the rear of the axle. This would mean a half turn of the wheels in the event that the gage was at the same height as the wheel axle. The relative position of the two pointers is next observed. If the pointers 19 and 20 still register, the wheels are true, but if not the new distance between pointers is measured giving the amount of adjustment needed for the wheels.

It is to be understood that the invention as herein disclosed may be varied from the details described and shown without departure from the spirit of the subjoined claim.

I claim:

In a wheel alignment device, an elongated tubular member, a finger adjustably mounted in one end of the tubular member, a pair of spaced sleeves slidably mounted on the other end portion of the tubular member, a pair of lugs formed integrally with each of the sleeves, an elongated finger fixedly mounted in the lugs and having an end portion projecting beyond the said other end portion of the tubular member, a collar fixedly mounted on the inner end of the tubular member and having a notch formed in its edge engaged by the projecting end portion of the elongated finger for support during movements thereof relative to the tubular member, relatively adjustable indexes mounted on the tubular member and the elongated finger between the sleeves and lugs, a coil spring extending between the collar and the outer of the sleeves, and a length of chain depending from the tubular member to gage a half turning movement of the wheels under test.

LOUIS FRANK JEZEK.

REFERENCES CITED

The following references are of record in the file of this patent:

UNITED STATES PATENTS

| Number | Name | Date |
|---|---|---|
| 349,917 | Ackley | Sept. 28, 1886 |
| 1,336,426 | Fredericksen | Apr. 13, 1920 |
| 1,440,067 | Duby | Dec. 26, 1922 |
| 1,638,723 | Barnes | Aug. 9, 1927 |
| 1,639,604 | Gray | Aug. 16, 1927 |
| 1,663,452 | Hershman et al. | Mar. 20, 1928 |
| 1,665,544 | Hartsock | Apr. 10, 1928 |
| 1,894,370 | Erickson | Jan. 17, 1933 |
| 1,946,961 | Blade | Feb. 13, 1934 |
| 1,970,092 | Hink | Aug. 14, 1934 |

FOREIGN PATENTS

| Number | Country | Date |
|---|---|---|
| 394,090 | Great Britain | June 22, 1933 |